US011891091B2

(12) United States Patent
Nagori et al.

(10) Patent No.: US 11,891,091 B2
(45) Date of Patent: Feb. 6, 2024

(54) SEMANTIC OCCUPANCY GRID MANAGEMENT IN ADAS/AUTONOMOUS DRIVING

(71) Applicant: Texas Instruments Incorporated, Dallas, TX (US)

(72) Inventors: Soyeb Noormohammed Nagori, Bangalore (IN); Deepak Poddar, Bangalore (IN); Hrushikesh Tukaram Garud, Parbhani (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 18/172,495

(22) Filed: Feb. 22, 2023

(65) Prior Publication Data

US 2023/0202524 A1    Jun. 29, 2023

Related U.S. Application Data

(63) Continuation of application No. 16/784,009, filed on Feb. 6, 2020, now Pat. No. 11,620,478.

(51) Int. Cl.
*B60W 60/00* (2020.01)
*G05D 1/02* (2020.01)
(Continued)

(52) U.S. Cl.
CPC ....... *B60W 60/0015* (2020.02); *G05D 1/0223* (2013.01); *G05D 1/0246* (2013.01);
(Continued)

(58) Field of Classification Search
CPC ......... B60W 60/0015; B60W 2420/42; B60W 2554/402; B60W 2554/4041;
(Continued)

(56) References Cited

U.S. PATENT DOCUMENTS 5,898,793 A * 4/1999 Karron .................... G06T 17/20
382/154
9,098,943 B1 * 8/2015 Baldwin ................... G06T 1/20
(Continued)

FOREIGN PATENT DOCUMENTS

CA    2660910 A1 *  2/2008  .......... G01S 5/0036
CA    2660910 A1    2/2008
(Continued)

*Primary Examiner* — Mahendra R Patel
(74) *Attorney, Agent, or Firm* — Brian D. Graham; Frank D. Cimino

(57) ABSTRACT

An example driver assistance system includes an object detection (OD) network, a semantic segmentation network, a processor, and a memory. In an example method, an image is received and stored in the memory. An object detection (OD) polygon is generated for each object detected in the image, and each OD polygon encompasses at least a portion of the corresponding object detected in the image. A region of interest (ROI) is associated with each OD polygon. Such method may further comprise generating a mask for each ROI, each mask configured as a bitmap approximating a size of the corresponding ROI; generating at least one boundary polygon for each mask based on the corresponding mask, each boundary polygon having multiple vertices and enclosing the corresponding mask; and reducing a number of vertices of the boundary polygons based on a comparison between points of the boundary polygons and respective points on the bitmaps.

18 Claims, 12 Drawing Sheets

(51) Int. Cl.
*G06V 20/58* (2022.01)
*G06F 18/21* (2023.01)
*G06V 10/764* (2022.01)
*G06V 10/82* (2022.01)

(52) U.S. Cl.
CPC ....... *G05D 1/0278* (2013.01); *G06F 18/2163* (2023.01); *G06V 10/764* (2022.01); *G06V 10/82* (2022.01); *G06V 20/58* (2022.01); *G05D 2201/0213* (2013.01)

(58) Field of Classification Search
CPC ............ B60W 2556/40; G05D 1/0223; G05D 1/0246; G05D 1/0278; G05D 2201/0213; G06F 18/2163; G06V 10/764; G06V 10/82; G06V 20/58
USPC .......................................................... 382/103
See application file for complete search history.

(56) References Cited

U.S. PATENT DOCUMENTS

| | | | | |
|---|---|---|---|---|
| 10,474,164 | B2* | 11/2019 | Wheeler | G08G 1/0112 |
| 10,824,156 | B1* | 11/2020 | Warshauer-Baker | B60W 60/001 |
| 2002/0196251 | A1* | 12/2002 | Duluk, Jr. | G06T 11/001 |
| | | | | 345/420 |
| 2006/0244748 | A1* | 11/2006 | Long | G06T 15/40 |
| | | | | 345/422 |
| 2007/0150846 | A1* | 6/2007 | Furnish | G06F 30/392 |
| | | | | 703/2 |
| 2008/0216038 | A1* | 9/2008 | Bose | G06F 30/392 |
| | | | | 716/118 |
| 2010/0014784 | A1* | 1/2010 | Silverbrook | G06V 30/142 |
| | | | | 382/313 |
| 2013/0129156 | A1* | 5/2013 | Wang | G06T 7/12 |
| | | | | 382/107 |
| 2016/0271795 | A1* | 9/2016 | Vicenti | G05D 1/0219 |
| 2017/0147734 | A1* | 5/2017 | Rosenbluth | G06F 30/367 |
| 2019/0228237 | A1* | 7/2019 | Chavali | G05D 1/0088 |
| 2019/0278292 | A1* | 9/2019 | Levinson | G06T 17/05 |
| 2019/0370275 | A1* | 12/2019 | Pfeifle | G06F 16/29 |
| 2020/0103523 | A1* | 4/2020 | Liu | G01S 13/865 |
| 2020/0189573 | A1* | 6/2020 | King | G06V 20/58 |
| 2020/0225669 | A1* | 7/2020 | Silva | B60W 60/0011 |

FOREIGN PATENT DOCUMENTS

| | | | | |
|---|---|---|---|---|
| CA | 2734613 | A1 | 2/2010 | |
| GB | 2527207 | A * | 12/2015 | ............ B25J 11/009 |
| GB | 2527207 | A | 12/2015 | |
| JP | 2000251091 | A * | 9/2000 | ............ G06T 15/04 |
| JP | 4385524 | B2 * | 12/2009 | ............ G06T 17/30 |
| WO | WO-2004114223 | A1 * | 12/2004 | ............ G06T 11/40 |

\* cited by examiner

SEMANTIC OCCUPANCY GRID MANAGEMENT IN ADAS/AUTONOMOUS DRIVING

CROSS-REFERENCE TO RELATED APPLICATIONS

This application is a continuation of, and cairns the benefit of priority under 35 U.S.C. § 120 on, U.S. application Ser. No. 16/784,009, filed Feb. 6, 2020, which claims the benefit of priority under 35 U.S.C. § 119 on India. Patent Application No. 201941004653, filed Feb. 6, 2019. The content of each of these prior applications is incorporated herein by reference in its entirety and for all purposes.

BACKGROUND

Various electronic driving systems include electronic processors configured to receive sensor input signals, process the received sensor input signals, and to generate driving output signals for driving a vehicle. In advanced driver-assistance systems (ADAS) for example, the driving output signals can include signals for informing a driver's situational awareness and/or signals for lane-control or parking the vehicle being driven. In autonomous driving (AD) systems for example, the driving output signals can include signals for driving a vehicle by electronically executing the same (or similar) functions that might otherwise be executed by a human driver of the vehicle. Increasing the safety of such systems can require increased processing power and/or more efficient processing architectures.

SUMMARY

In an example, a method to update a vehicle occupancy grid (OG) includes receiving an image; generating an object detection (OD) polygon for each object detected in the image, each generated OD polygon encompassing at least a portion of the corresponding object detected in the image; associating a region of interest (ROI) with each generated OD polygon; generating a mask for each ROI, each mask configured as a bitmap approximating a size of the corresponding ROI; generating at least one boundary polygon for each mask based on the corresponding mask, each boundary polygon having multiple vertices and enclosing the corresponding mask; and reducing a number of vertices of the boundary polygons based on a comparison between points of the boundary polygons and respective points on the bitmaps.

DETAILED DESCRIPTION

Figure 1:
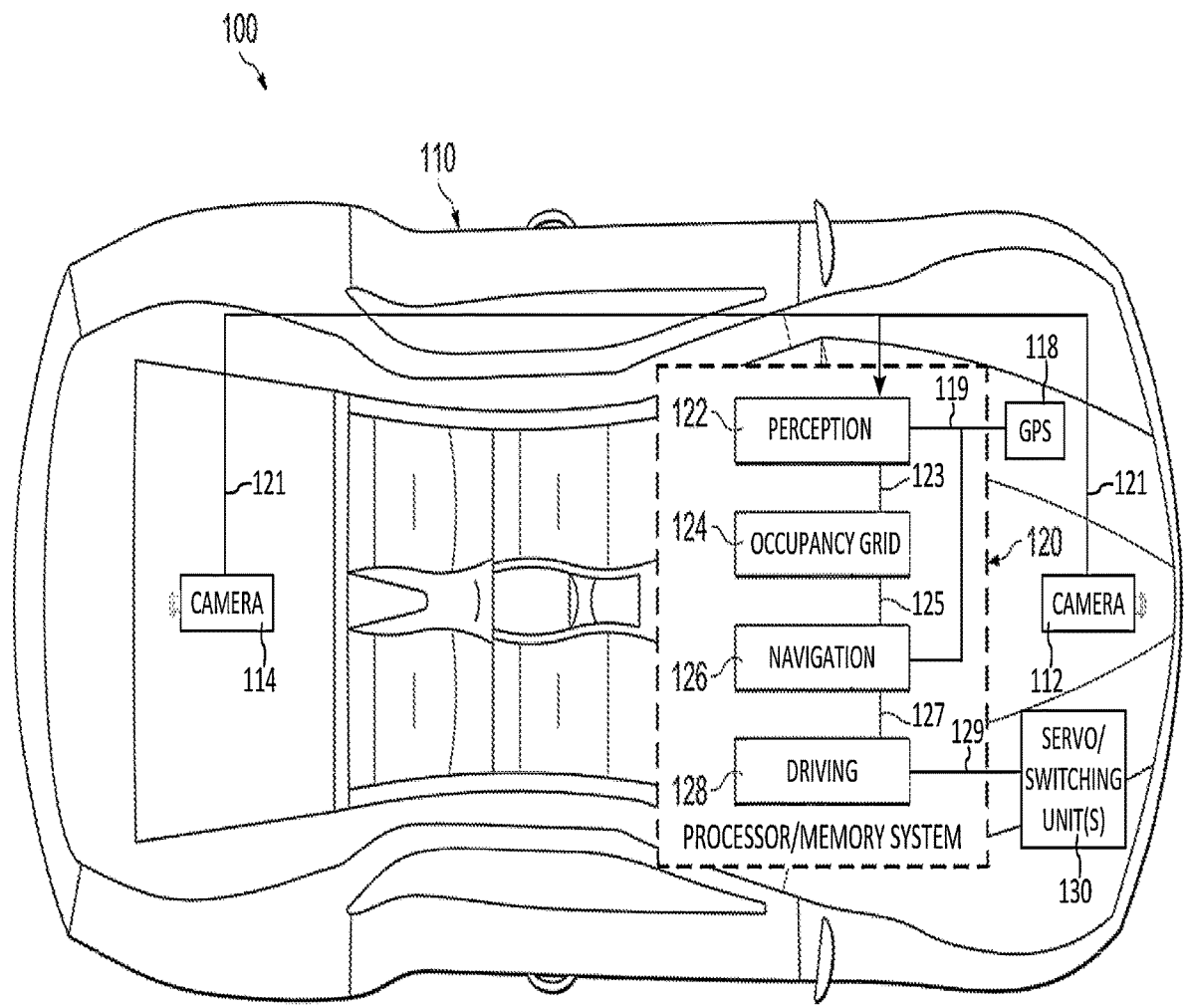
FIG. 1 is a system diagram showing an example vehicle that includes an example ADAS/AD system adapted to efficiently manage an example occupancy grid in response to perception information and semantic segmentation information.

In the drawings, like reference numerals refer to like elements, and the various features are not necessarily drawn to scale.

Various vehicle driving systems (such as ADAS/AD systems) employ video cameras and other proximity sensors to obtain environmental information for driving. The environmental information is processed by one or more processors to map and identify objects around the vehicle being controlled (e.g., at least partially controlled). The processors (via a driving interface) electronically control one or more operations of the vehicle in response to the identified and mapped objects, so that the vehicle can be more safely driven. The processors can also provide notifications and actuate aural and visual indicators in response to the identified and mapped objects. Safety is of concern whether the ADAS/AD system is installed in the vehicle being driven, or whether the ADAS/AD system is remotely located (e.g., so that the vehicle is being remotely controlled).

The accuracy of an ADAS/AD system determines a level of safety that can be afforded by the vehicular detection system. For example, failure to properly locate certain objects within a certain range (e.g., within a safe braking distance) or failure to properly identify certain objects (e.g., a manhole cover or an animal) can decrease levels of safety provided by an ADAS/AD system. Increasing the accuracy and processing speeds of an ADAS/AD system can increase the safety of occupants of a driven vehicle that includes the vehicle detection system. Further, safety can be also be increased for other motorists, pedestrians and animals in or around the path of the vehicle being driven under an ADAS/AD system.

FIG. 1 is a system diagram showing an example vehicle that includes an example ADAS/AD system adapted to efficiently manage (e.g., populate and update) an example occupancy grid in response to perception information. Generally described, the system 100 is an example system that includes a host vehicle 110. An example ADAS/AD processor/memory system such as ADAS/AD system 120 can be installed in the host vehicle 110. The example ADAS/AD system 120 can include any number of cameras (such as forward-driving camera 112 and backing camera 114), which can be networked (e.g., via video link 121) to send video (e.g., a temporal sequence of image frames) to the ADAS/AD system 120 for processing and vehicle control.

An example ADAS/AD system 120 can include a perception module 122, an occupancy grid module 124, a navigation module 126, and a driving module 128. The perception module 122 is coupled (e.g., logically coupled) to the occupancy grid module 124 via link 123, the occupancy grid module 124 is coupled to the navigation module 126 via link 125, the navigation module 126 is coupled to the driving module 128 via link 127, and the driving module 128 is coupled to the servo/switching unit(s) 130 via link 129. The servo/switching unit(s) 130 are configured to perform a driving action such as actuating/controlling electro-mechanical controls (e.g., for throttle control, power brakes or steering) or electronic switches (e.g., for serving notifications to a vehicle passenger and/or activating aural and/or visual indicators or illuminators). A GPS (global positioning system) system 118 can be coupled (via the link 119) to the perception module 122 and the navigation system 126, so that, for example, perception (e.g., including object detection and semantic segmentation information) can be determined in response to the absolute location and heading (e.g., bearing or orientation) of the vehicle 110. For example, the perception module can generate the updated occupancy grid in response to coordinates received from the GPS, and the navigation module can generate the driving action in response to coordinates received from the GPS.

The perception module 122, the occupancy grid module 124, the navigation module 126, and the driving module 128 can be implemented as special-purpose hardware or implemented using a processor programed to execute a specific function having real-world applications (e.g., ADAS/AD functions). The respective functionalities for the modules can be implemented using a same processor, different respective processors, different processor cores of a same multiple-core processor, or combinations thereof.

The perception functionality can be executed by a perception module 122 that includes processing resources arranged for processing information received from various sensors (where some sensors can be on the vehicle, and other sensors can be off the vehicle). The example ADAS/AD system 120 expresses perception information (e.g., generated by perception module 122) in terms of a homogenous coordinate system, which is stored as homogenized perception information in the occupancy grid (OG) module 124. Perception information is described hereinbelow with respect to FIG. 7.

The OG module 124 initializes and maintains (e.g., collectively, manages) the OG memory image (e.g., tiles of the OG). As described hereinbelow with reference to FIG. 3, an OG includes tiles, which, for example, can indicate the presence of an obstacle or otherwise indicate the area represented by the tile is free to be driven in or through.

The navigation functionality can be executed by a navigation module 126 for controlling mechanical vehicle driving systems. The navigation module 126 is arranged to control the mechanical vehicle driving systems in response to homogenized perception information received from the OG. As described hereinbelow (e.g., with reference to FIG. 5A and FIG. 5B), the homogenized coordinate system of the perception information reduces processing requirements of the navigation module that might otherwise be required to inter-convert relevant coordinates for correlating perception information and navigation information. The OG can be coupled to the perception module 122 and the navigation module 126 via respective high-speed data lanes (e.g., links 123 and 127, respectively).

The efficient coupling of the perception information via the OG to the navigation module 126 can increase vehicle safety and/or can reduce processing power requirements. The navigation module 126 includes processing resources (e.g., a processor) for classifying/bounding polygons for object detecting, for lane marking analysis and parking spot detection, and for generating pixel-level information from information generated by semantic segmentation, motion segmentation and depth estimation tasks.

Figure 2:
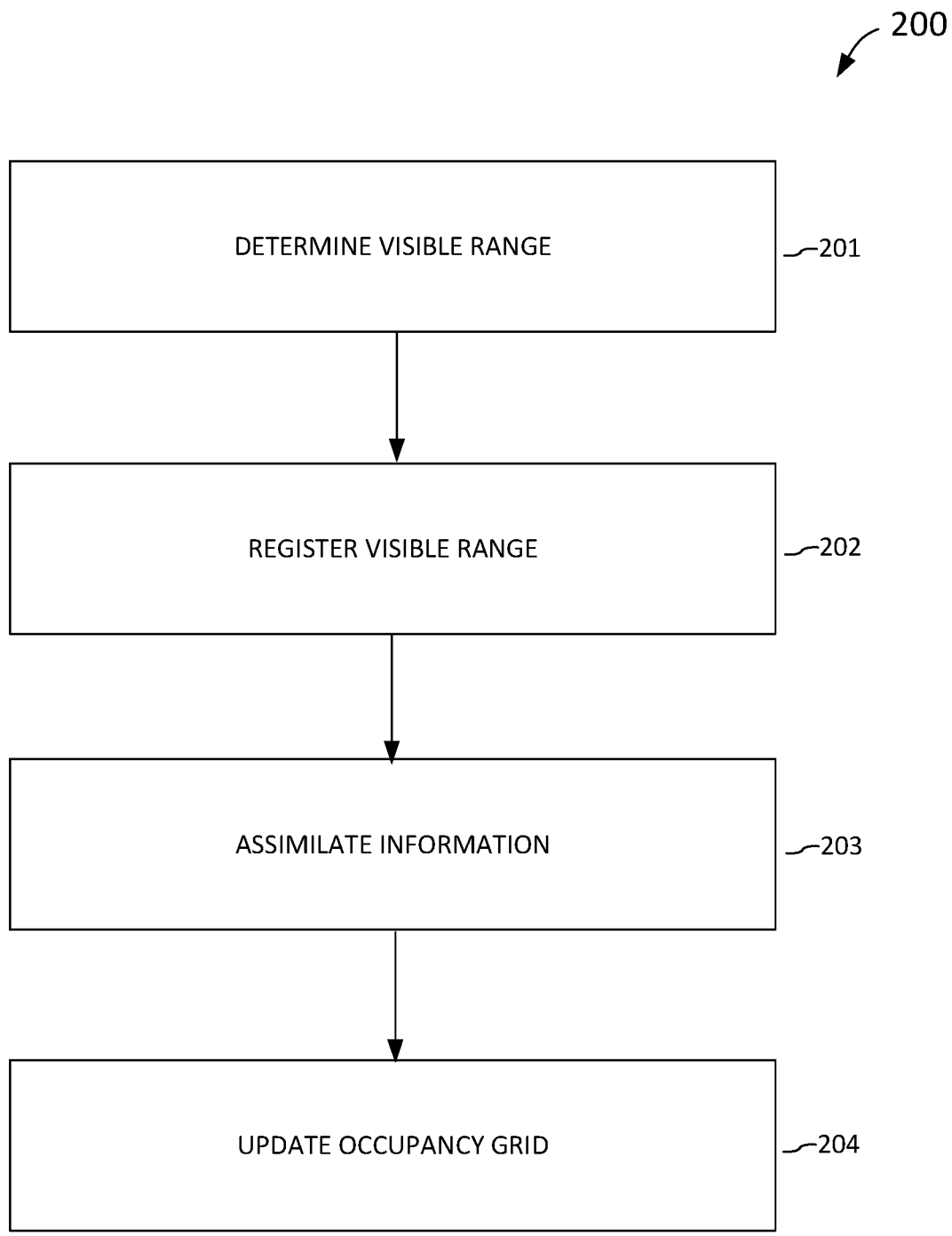
FIG. 2 is a flow diagram of an example method for semantic occupancy grid management in an example ADAS/AD system.

FIG. 2 is a flow diagram of an example method for semantic occupancy grid management in an example ADAS/AD system. Briefly described, program flow of method 200 can be initiated at box 201, where the perception module 122 can determine a visible range e.g., (described herein following). Program flow can continue at box 202 in which the perception module 122 or the OG module 124 can register the visible range within the OG (e.g., described herein following with respect to FIG. 3, FIG. 4, FIG. 5A and FIG. 5B). Program flow can continue at box 203 in which information of subset of the tiles of the global OG can be efficiently assimilated (e.g., described herein below with respect to FIG. 6, FIG. 7, FIG. 8 and FIG. 9). Program flow can be continued at box 204 in which each tile in a vehicle OG can be updated by designating which tiles are "drivable" (e.g., described herein following with respect to FIG. 10 and FIG. 11).

The "world" occupancy grid (global OG) is a grid, which represents a two-dimensional area (e.g., width and height) of the physical world, which can correspond to a ground plane having drivable and non-drivable areas. The individual tiles (e.g., squares) of the grid are relatively small areas that respectively indicate whether (or not) a particular tile is drivable. As described herein, a "vehicle" OG is a "subset" of the global OG, where the vehicle OG expresses coordinates from the point of view of the vehicle (e.g., as described herein following). In an example where a tile size is 25 cm by 25 cm, a vehicle OG having an area of 100 meters by 100 meters can include as many as 160,000 tiles. The program flow of FIG. 2 includes processes for efficiently managing the vehicle OG.

Figure 3:
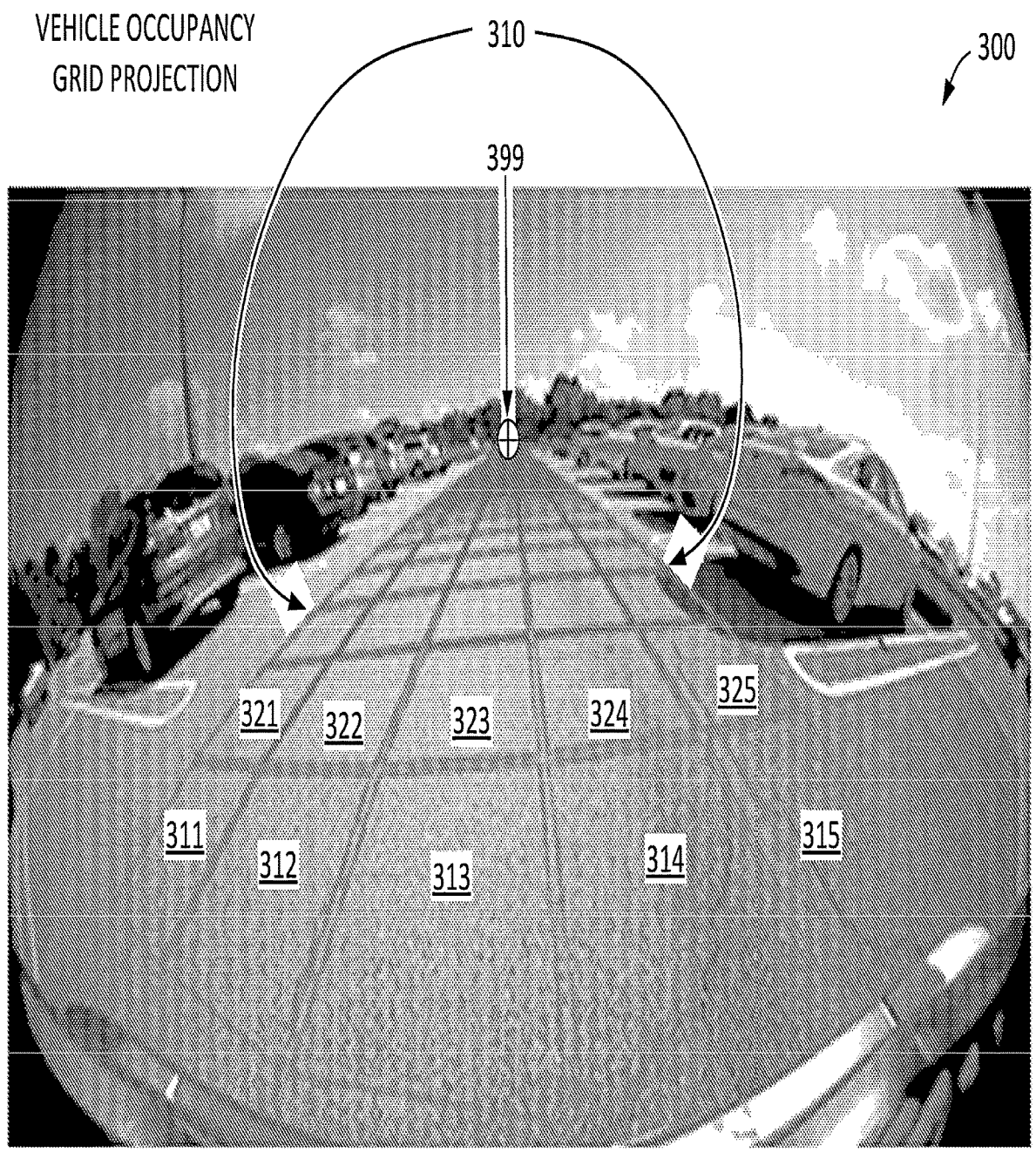
FIG. 3 is an example projection of a portion of a vehicle OG onto an example image generated by a camera of a vehicle under a control of an example ADAS/AD system.

At box 201 (of FIG. 2), the visual range of a vehicle camera is determined. As shown in FIG. 3, tiles (which represent a portion of the visual range) can be mapped (e.g., projected) onto an image generated by a vehicle camera, so that the vehicle OG is positioned and oriented with respect to an instantaneous (e.g., within a shutter speed duration) position and orientation of the vehicle being controlled.

FIG. 3 is an example projection of a portion of a vehicle OG onto an example image generated by a camera of a vehicle under a control of an example ADAS/AD system. Image 300 is a mapped image that includes visible representations of the tiles of the vehicle OG 310. For example, a closest row of tiles includes tiles 311, 312, 313, 314 and 315, and a next-closest row of tiles includes tiles 321, 322, 323, 324 and 325.

Generally described, the vertical lines of the tiles appear to converge upon a notional vanishing point 399. A visual range of the vehicle camera can be fully or partially predetermined (e.g., determined in response to camera positioning, imager resolution, and lens focal length) and/or determined in response to a pixel distance (e.g., 1-10 pixels between two converging vertical lines).

The outline of the tiles of the vehicle OG can be projected onto a current camera image in response to a transformation:

$$p3c = T\_cam\_to\_world * p3w \quad (1)$$

where p3w is a three-dimensional point in a "world" coordinate system, T_cam_to_world is a 6-degrees of freedom transformation, and p3c is a three-dimensional point transformed into a coordinate system of the camera.

For example, the three-dimensional points can be represented using a homogenous coordinate system (as described herein following). Each of the tiles can be represented as a rectangular shape having four vertices expressed in homogenous coordinates. The tiles of the global OG can be transformed into tiles of the vehicle OG by transforming (e.g., by using the transformation T_cam_to_world) the vertices (e.g., four points each expressed as p3w) of each tile of the global OG into vertices (e.g., four points each expressed as p3c) of each tile of the vehicle OG.

In the example, the T_cam_to_world transformation can be expressed as a 4 by 4 matrix for transforming the homogenous coordinates of the global OG (e.g., the coordinates of p3w) into the homogenous coordinates of the vehicle OG (e.g., the coordinates of p3c). A portion of the global OG can be mapped (and oriented) in response to comparing a heading and latitude and longitude coordinates of the vehicle (e.g., derived from a vehicle GPS, inertial navigation system, or a camera-based egocentric localization process) against longitude and latitude coordinates of the global OG.

At box 202 of FIG. 2, the current visible range is registered in the global OG (e.g., the four corners of the current visible range can be expressed in the terms of the coordinate system of the global OG).

Figure 4:
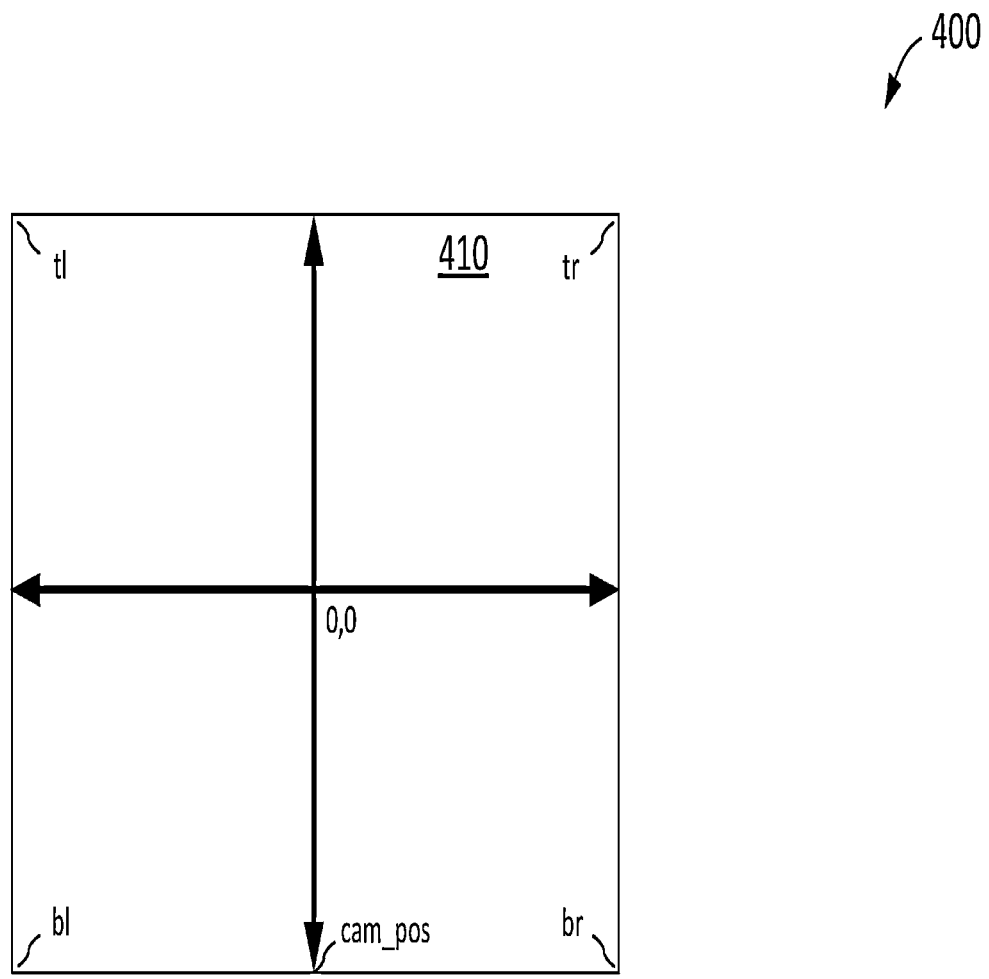
FIG. 4 is a schematic of an example coordinate system of a visible range of a vehicle camera of an example ADAS/AD system.
Figure 4:
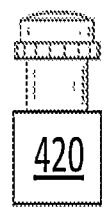

FIG. 4 is a schematic of an example coordinate system of a visible range of a vehicle camera of an example ADAS/AD system. For example, schematic 400 includes an example visible range 410 of an example vehicle camera 420. The visible range 410 includes a top-right vertex tr, a top-left vertex tl, a bottom left vertex bl and a bottom right vertex br.

The visible range 410 is centered about the pointing axis of the camera 420, so that the position of the camera (cameos) 420 is registered as being halfway between the br and bl points. Also, the top half of the visible range is equally divided with the bottom-half of the visible range, which (together with the pointing axis of the camera 420) defines a central coordinate 0,0 that is centered within the visible range 410. In homogenous coordinates the four vertices and camera position of the visible range can be expressed as:

$$tr=[visible\_range\_x/2.0, +visible\_range\_y/2.0,0.0,1.0] \quad (2)$$

$$tl=[-visible\_range\_x/2.0, +visible\_range\_y/2.0,0.0, 1.0] \quad (3)$$

$$bl=[-visible\_range\_x/2.0, -visible\_range\_y/2.0,0.0, 1.0] \quad (4)$$

$$br=[+visible\_range\_x/2.0, -visible\_range\_y/2.0,0.0, 1.0] \quad (5)$$

$$cam\_pos32\ [0,-params.visible\_range\_y/2,0.0,1.0] \quad (6)$$

A z-axis (not shown) is orthogonal to the x- and y-axes (e.g., which extend through the ground plane, which includes the vehicle OG tiles) through the central coordinate. A rotation of the visible range 410 about the z-axis is shown in FIG. 5A.

Figure 5A:
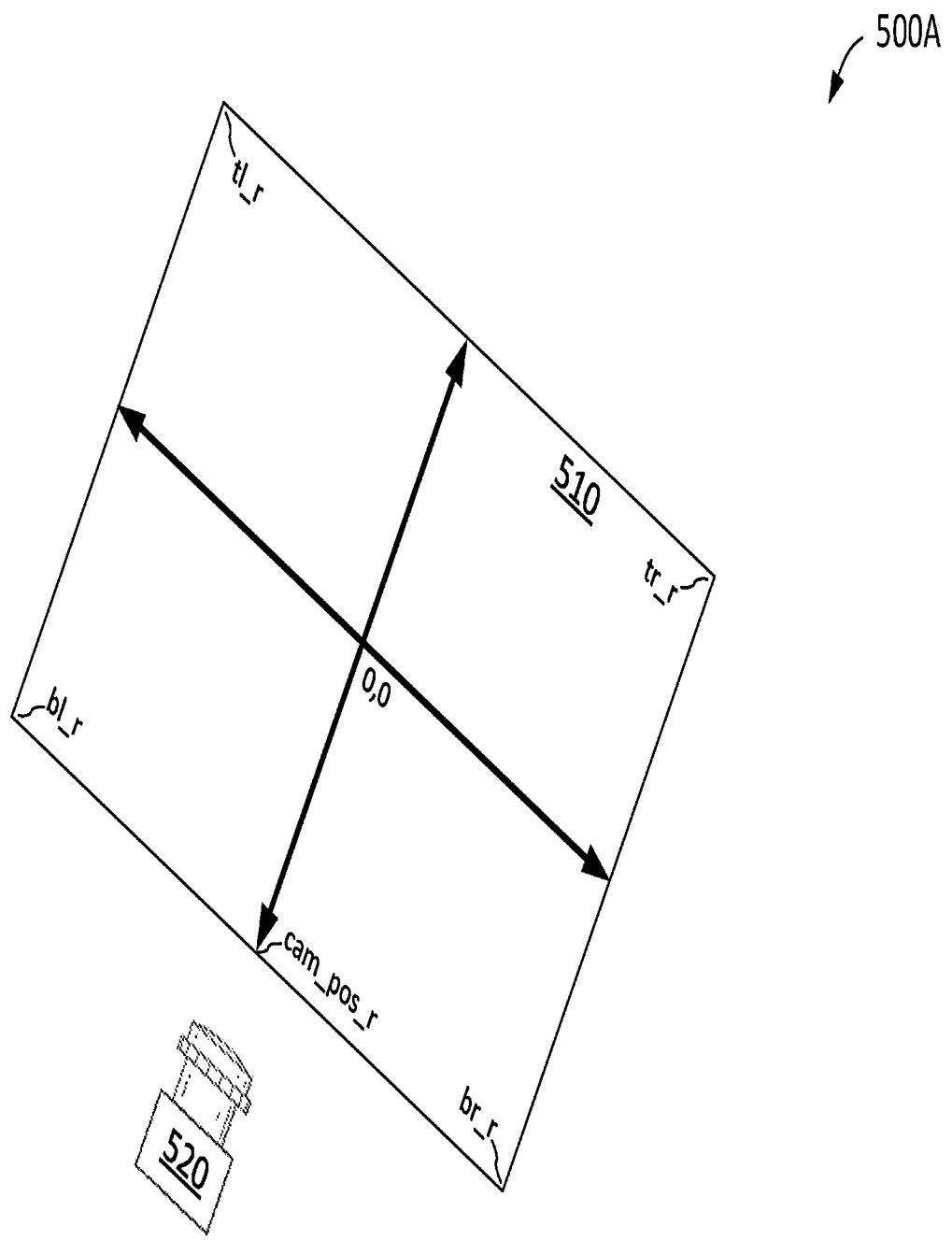
FIG. 5A is a schematic of an example rotation about the z-axis of the example visible range of FIG. 4.

FIG. 5A is a schematic of an example rotation about the z-axis of the example visible range of FIG. 4. For example, visible range 510 is a rotation (e.g., a pure rotation without translation) of the visible range 410 about the z-axis. In response to the rotation, the four vertices (and the camera position) of the visible range 410 are transformed respectively into a rotated top-right vertex tr_r, a rotated top-left vertex tl_r, a rotated bottom-right vertex br_r, a rotated bottom-left vertex bl_r, and a rotated camera position cam_pos_r, so that:

$$tr\_r, tl\_r, br\_r, bl\_r, cam\_pos\_r=T\_pure\_rot(tr, tl, br, bl, cam\_pos) \quad (7)$$

where T_pure_rot is a pure rotation transform for rotation of the visible range 410 about the z-axis, which intersects the ground plane at the central point 0,0. The rotated visible range 510 is registered (e.g., expressed) in the global OG as shown in FIG. 5B.

Figure 5B:
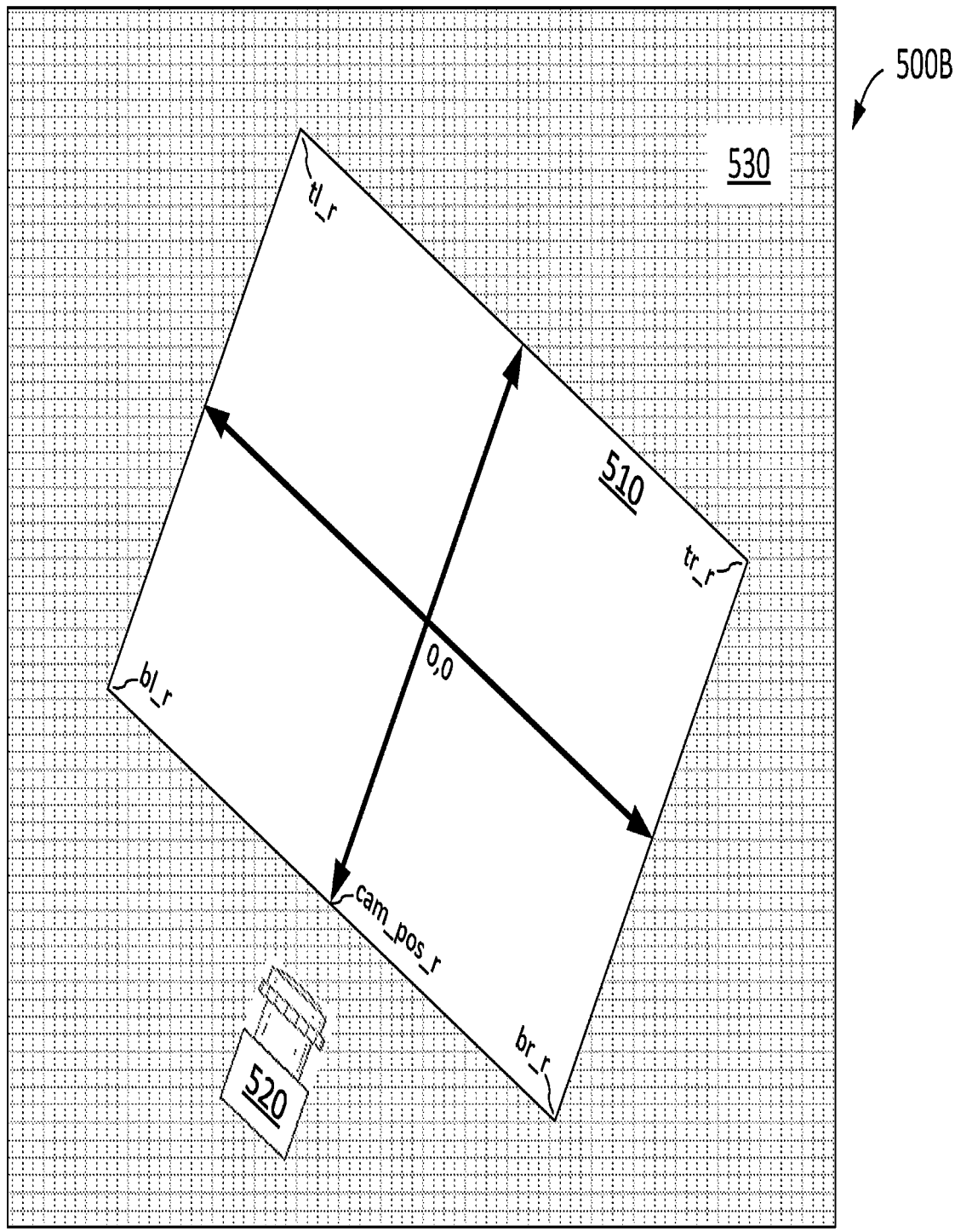
FIG. 5B is a schematic of an example registration of the example rotated visible range of FIG. 5A.

FIG. 5B is a schematic of an example registration of the example rotated visible range of FIG. 5A. The example registration of the rotated visible range 510 transforms respectively the rotated four vertices (and the camera position) of the rotated visible range 510 into a world top-right vertex tr_w, a rotated top-left vertex tl_w, a rotated bottom-right vertex br_w, a rotated bottom-left vertex bw_r, and a rotated camera position cam_pos_w.

The rotated visible range 510 is offset onto the global coordinate system of the global (e.g., world) OG 530 (which itself is referenced to the origin 0,0 of the OG 530), where the offset is expressed as a $\Delta x$ and a $\Delta y$. The $\Delta x$ can be determined as:

$$\Delta x = cam\_pos\_w[0]-cam\_pos\_r[0] \quad (8)$$

where [0] represents the x-coordinate in homogenous coordinates, and the $\Delta y$ can be determined as:

$$\Delta y = cam\_pos\_w[1]-cam\_pos\_r[1] \quad (9)$$

where [1] represents the y-coordinate in homogenous coordinates.

The vertices of the rotated visible range 510 can be registered (e.g., expressed) in the global OG 530 as:

$$tl\_w=tl\_r+[\Delta x, \Delta y], \quad (10)$$

$$tr\_w=tr\_r+[\Delta x, \Delta y], \quad (11)$$

$$br\_w=tr\_r+[\Delta x, \Delta y],\ and \quad (12)$$

$$br\_w=br\_r+[\Delta x, \Delta y] \quad (13)$$

The translation of corresponding coordinates by a constant offset helps ensure the rotation angle of the rotated visible range 510 is the same in FIG. 5A and FIG. 5B, for example. The correspondence of the tiles of the rotated visible range 510 to the tiles of the global OG 530 facilitates searching the tiles of the global OG 530 when the search is restricted (for example) to the tiles of the global OG 530 that correspond to respective visible tiles of the visible range 510.

With reference to box 203 of FIG. 2, an example of assimilating information of subset of the tiles of the global OG is described hereinbelow with reference to FIG. 6, FIG. 7, FIG. 8 and FIG. 9.

Figure 6:
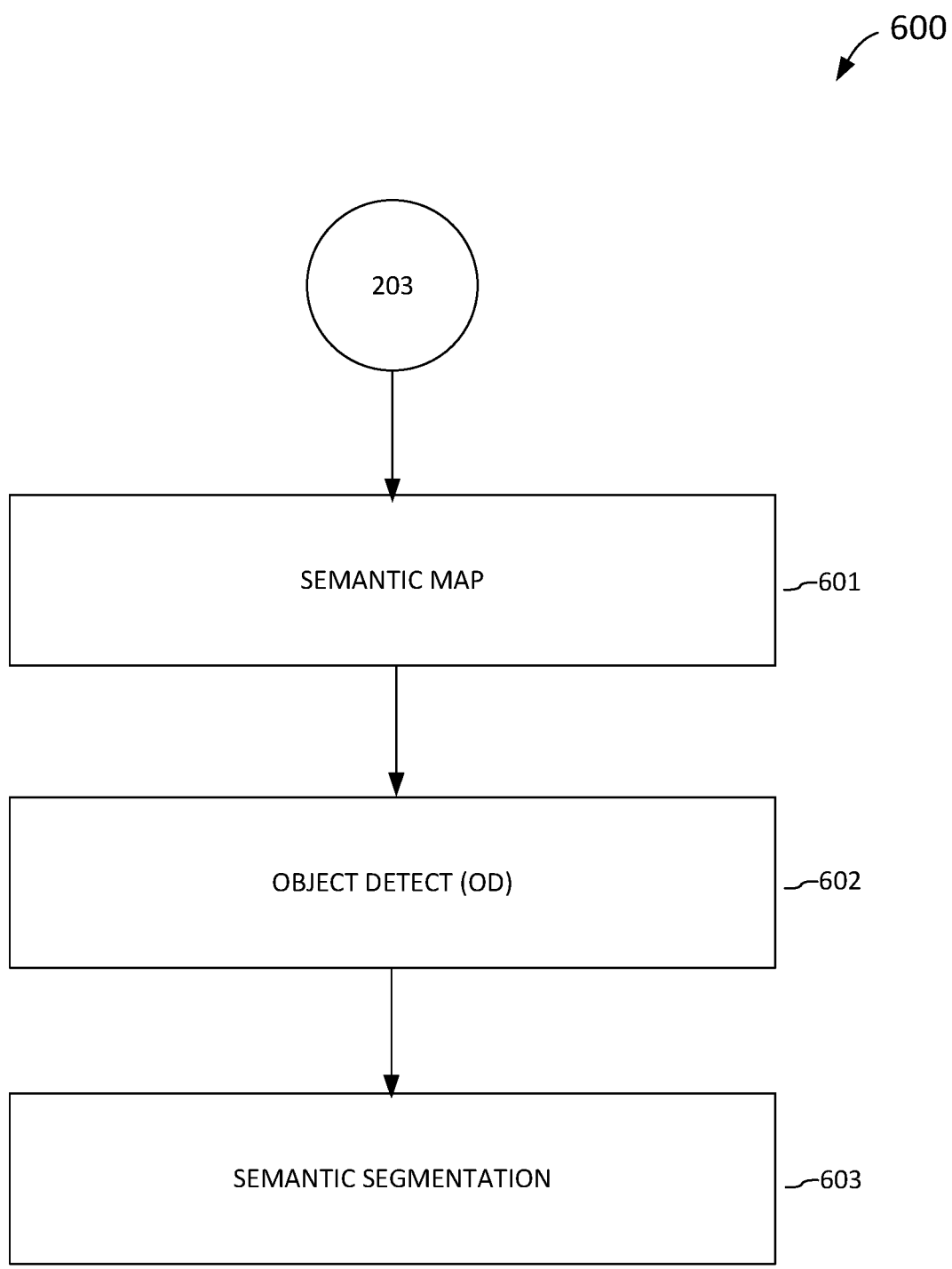
FIG. 6 is a flow diagram of an example method for assimilating information of a subset of the tiles of a global OG in an example ADAS/AD system.

FIG. 6 is a flow diagram of an example method for assimilating information of a subset of the tiles of a global OG in an example ADAS/AD system. For example, program flow of method 600 is initiated at box 601, where information corresponding to the tiles of a vehicle OG is extracted from a semantic map in response to the addressing areas of the semantic map that correspond to respective tiles of the vehicle OG. The areas of the semantic map can be addressed using coordinates that are offset (e.g., using the offset determined in accordance with Equations 8 and 9) from respective tiles of the vehicle OG.

The semantic map can indicate roads and other drivable objects/areas. The semantic map can also indicate objects such as static obstacles and parking place information. The information of the semantic map can be retrieved by asserting a location (e.g., a location determined in response to a particular vehicle OG tile) to index (e.g., to address) the semantic map.

At box 602, objects of a video image (e.g., a frame of a video stream) are detected. The objects can be detected by a trained object detect (OD) "neural" network (e.g., including deep learning and/or convolutional neural networks) included by the navigation module 126 (for example). The OD network can be trained for detecting any object that could be a potential obstacle in the visible range that is encountered while driving. Example obstacles can include pedestrians, vehicles, cyclists, animals and the like. The OD network can be trained to express the potential obstacles by generating a respective polygon, where each polygon encompasses a portion of the image that depicts a corresponding potential object (see, FIG. 7, for example). The OD polygons convey an area in which an object has been detected, whereas the semantic segmentation information (described herein following) conveys a type or kind of an object, for example, on a pixel by pixel basis.

At box 603, features within the video image are identified. The objects can be detected by a trained semantic segmentation (SS or "sem-seg") neural network included by the perception module 122 (for example). The OD network can be trained for detecting any object that could be a potential obstacle in the visible range that is encountered while driving. Example obstacles can include pedestrians, vehicles, cyclists, animals and the like. The SS network can be trained to associate patterns of pixels with types of objects, such as roads, vehicles, vegetation, sky, and the like. The semantic segmentation information conveys a type or kind of identified patterns of pixels, for example, on a pixel by pixel basis (e.g., as a region of pixels in an image). However, accessing the semantic segmentation on a pixel by pixel basis can be time consuming. A method for efficiently extracting the semantic segmentation information and combining the extracted semantic segmentation information is described hereinbelow with respect to FIG. 9, FIG. 10, and FIG. 11.

Figure 7:
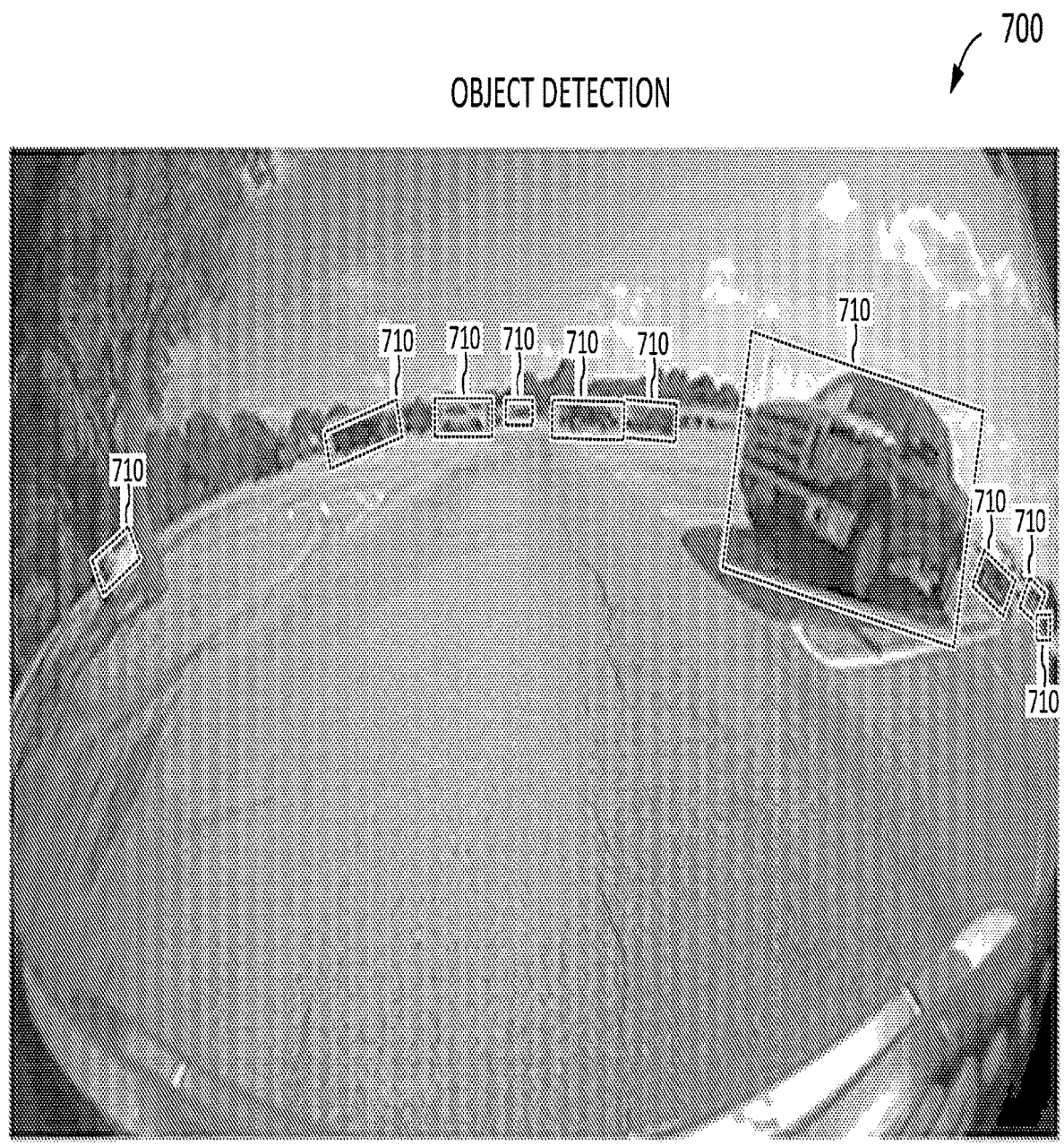
FIG. 7 is an example projection of polygons representing objects detected in an example image generated by a camera of a vehicle under a control of an example ADAS/AD system.

FIG. 7 is an example projection of polygons representing objects detected in an example image generated by a camera of a vehicle under a control of an example ADAS/AD system. Image 700 is a mapped image that includes visible representations of polygons 710 (e.g., which can be described as "contours") encompassing each object detected by an OD network. For example, the OD network detected ten objects in image 700, where the detected objects are respectively enclosed (e.g., totally enclosed) by a polygon 710. Each of the polygons defines a boundary that surrounds an area of the image that includes a visual representation of the object (e.g., includes an "object"). A pixel margin exists that is denoted by a number of pixels that lie between a selected point of the polygon and a respective (e.g., closest) point of the object being surrounded by the respective polygon. (The term "polygon" used herein can refer to any geometric shape used to describe the contours—or bounds—of an object for detection and/or identification.) In an example, the OD network can determine a classification of the kind of object detected (e.g., such as "vehicle").

Figure 8:
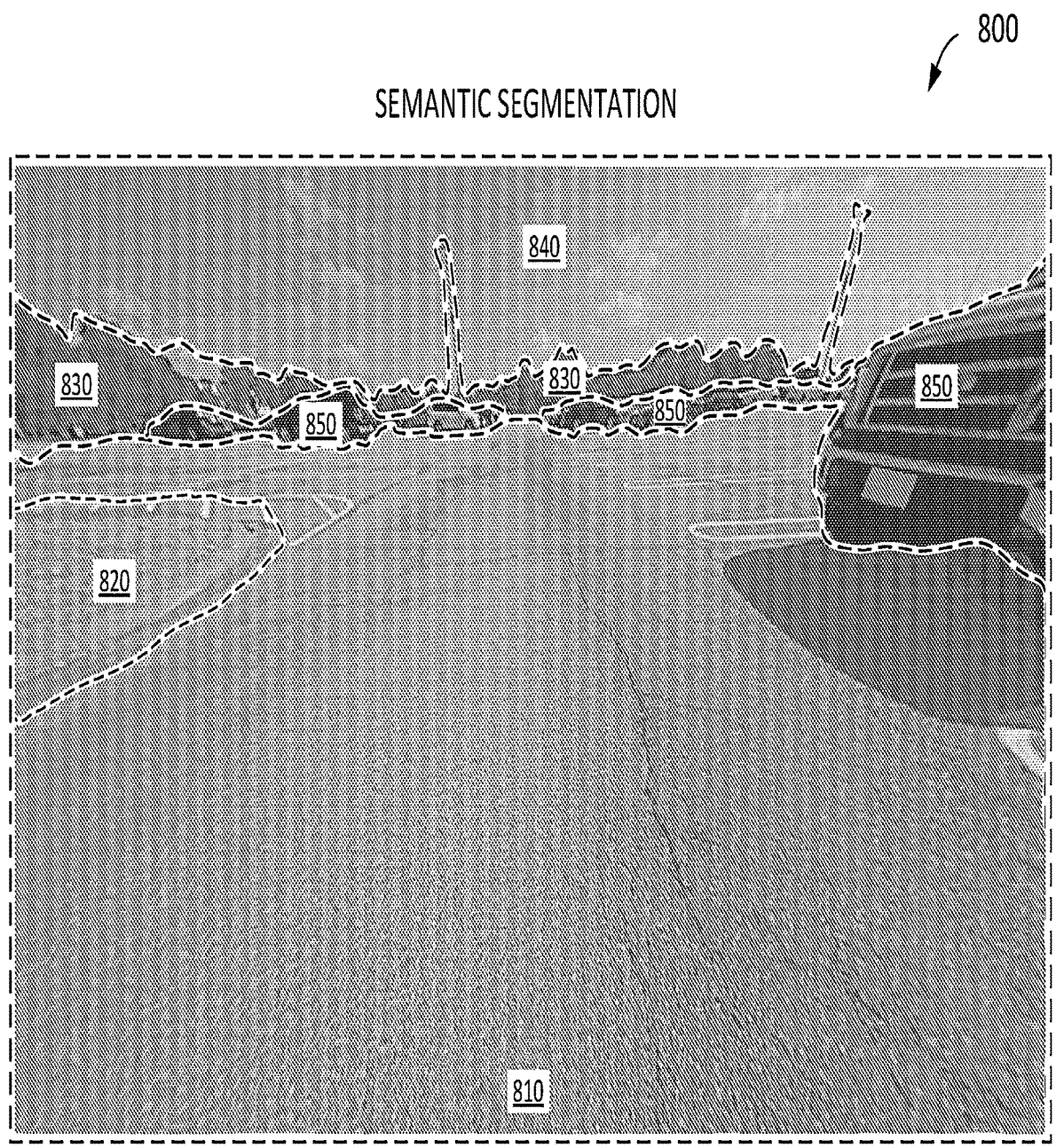
FIG. 8 is an example projection of polygons representing semantically segmented areas detected in an example image generated by a camera of a vehicle under a control of an example ADAS/AD system.

FIG. 8 is an example projection of polygons representing semantically segmented contours detected in an example image generated by a camera of a vehicle under a control of an example ADAS/AD system. Image 800 is a mapped image generated by a semantic segmentation network (SS network). The image 800 includes regions (e.g., which can be described as "contours") that include pixels that have been identified as belonging to a particular kind of object. For example, region 810 is associated with a road, region 820 is identified with a curb, regions 830 are identified with vegetation, region 840 is identified as the sky, and regions 850 are identified with vehicles. Each pixel of each region can be identified by accessing the pixel to determine the association of the pixel to an identifiable type of region.

As described above, merely accessing each pixel to determine the extent of the region to which the pixel belongs can be relatively time consuming. A pixel margin exists that is denoted by a number of pixels that lie between a selected point of the polygon and a respective (e.g., closest) point of the object being surrounded by the respective polygon. In an example, the SS network can determine a location (e.g., region) of the object(s) detected by the SS network.

With reference to box 603 of FIG. 6, an example of semantic segmentation for identifying features within the video image is described hereinbelow with reference to FIG. 9.

Figure 9:
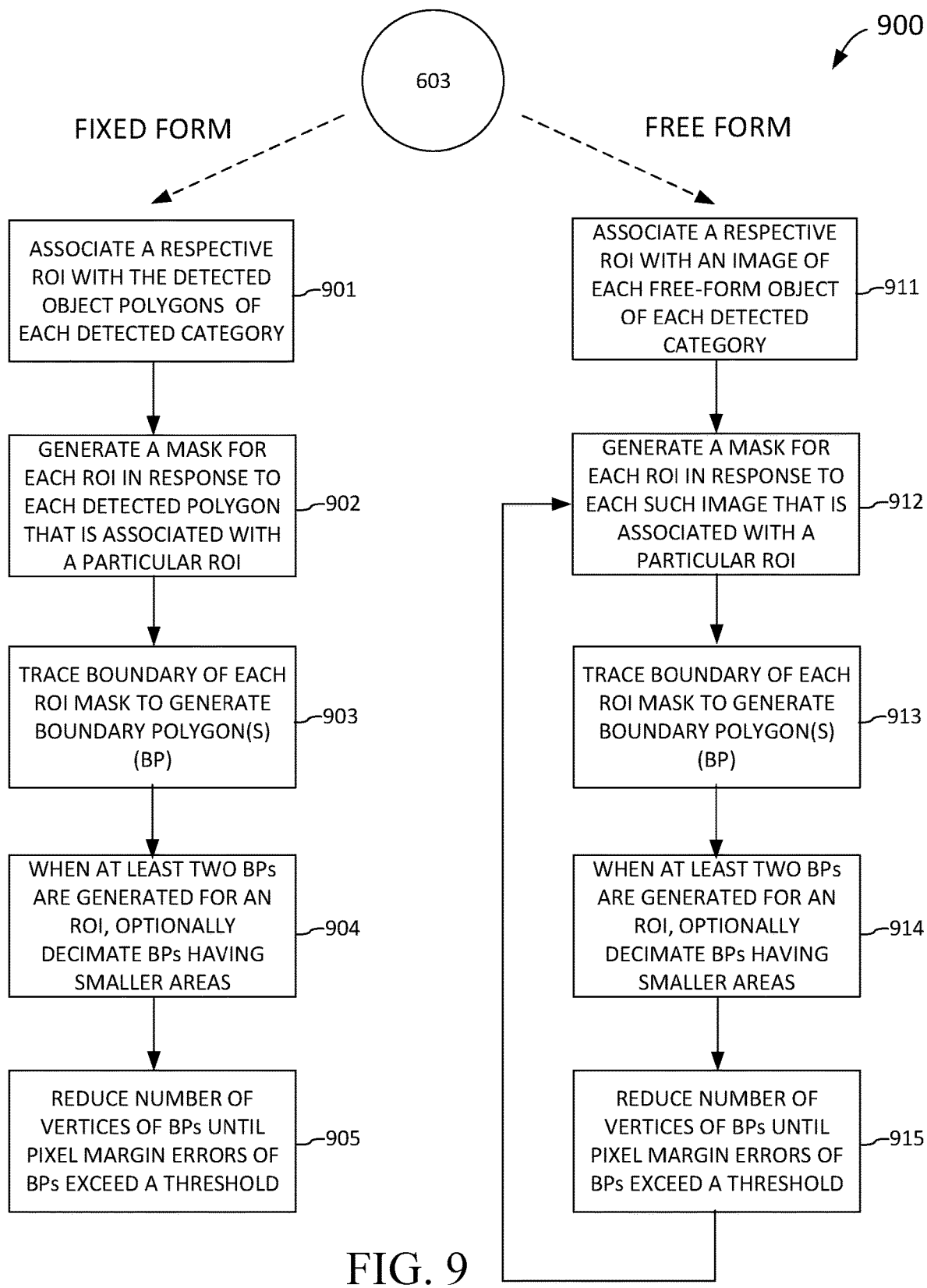
FIG. 9 is a flow diagram of an example method for semantic segmentation for identifying features included in a video image in an example ADAS/AD system.

FIG. 9 is a flow diagram of an example method for semantic segmentation for identifying features included in a video image in an example ADAS/AD system. A method 900 for expressing semantic segmentation in compact form as contour information is described herein following.

The method 900 includes a first flow for fixed-form objects (e.g., having a classification such as pedestrians or vehicles, where the OD network has also been trained to identify such fixed-form classifications) and a second flow for free-form objects (e.g., having a classification such as sky or roads, where the semantic segmentation network has been trained to identify such free-form classifications). The first flow (for updating an OG based on objects that have been classified as fixed-form objects) includes the boxes 901, 902, 903, 904 and 905, and the second flow (for updating an OG based on objects that have been classified as fixed-form objects) includes the boxes 911, 912, 913, 914 and 915. Both the first and second flows can be executed to update and/or query a vehicle OG, for example, when the OD network identifies fixed-form objects in a video image, and when the semantic segmentation network identifies free-form objects in the video image.

In example method of ADAS/AD system based on classified fixed-form objects, the first flow of method 900 can be initiated at box 901. At box 901, a processor of an example ADAS/AD system is executed to associate a respective region of interest (ROI) with the detected object polygons of each detected category. For example, a respective ROI is instantiated for each category of objects so identified by an OD network. Each instantiated ROI is associated with (e.g., assigned a logical relationship with) a respective category that has been identified by the OD network for each of the objects detected by the OD network. Because the semantic segmentation network does not discriminate between various instances of the same kinds of detected objects (e.g., discriminating one pedestrian from another), associating each ROI with a respective category for each of the detected objects facilitates downstream processing that includes assimilating detected object classifications for each of the detected objects.

At box 902, a respective mask is generated in response to each of the detected object polygons of each category. The mask for an ROI of a particular category can be a bitmap corresponding to the size of the ROI associated with the particular category. Areas of each mask that are pointed to by the detected object polygons of the particular category can be set to indicate a correspondence (or cleared to indicate a lack of correspondence) with each of the detected object polygons of the particular category.

At box 903, boundary polygons (BPs) derived from a respective mask are generated by tracing the boundaries of the set bits (or cleared bits) of each respective mask bitmap. BPs are generated for each of the mask bitmaps of each respective category. Each of the boundary polygons of a particular mask bitmap encloses a bitmap area that includes at least one detected object of the category associated with the particular mask bitmap.

At box 904, for each of the BPs generated from a respective mask, the BPs that are smaller than a selected threshold can be optionally decimated. For an example set of BPs generated from a particular mask, a smaller BP having an area that is less than 25 percent of the area of the largest BP, the smaller BP can be removed or otherwise erased. Erasing the smaller BPs can reduce processing requirements.

At box 905, the number of vertices in a BP can be reduced until pixel margin errors between a point of the BP and a corresponding point of the boundary of the bitmap exceeds pixel margin threshold. Using an example pixel margin threshold value of 4-16 can reduce the number of vertices of the generated BPs to around 20 to 30 vertices (e.g., which is a reduction over the number of vertices potentially present in the indicated mask areas of the mask bitmap). The reduced-vertices BPs represent otherwise complex pixel level information in a compact, easy-to-process form (e.g., in the form of a polygon or other geometrically defined contour object).

In example method of ADAS/AD system based on classified free-form objects, the second flow of method 900 can be initiated at box 911. At box 911, a processor of an example ADAS/AD system is executed to associate a respective region of interest (ROI) with an image of each free-form object of each detected category. For example, a respective ROI is instantiated for each category of image areas so identified by a semantic segmentation network. For example, a "sky" image area can be defined as separate ROI (e.g., so that the ROI does not include any identified areas other than the areas identified as "sky."

At box 912, a respective mask is generated in response to each identified image of each free-form object of each detected category. The mask for an ROI of a particular category can be a bitmap corresponding to the size of the ROI associated with the particular category. Areas of each mask that are pointed to by the pixels of each free-form object of each detected category of the particular category can be set to indicate a correspondence (or cleared to indicate a lack of correspondence) with each of the detected object polygons of the particular category.

At box 913, boundary polygons (BPs) derived from a respective mask are generated by tracing the boundaries of the set bits (or cleared bits) of each respective mask bitmap. BPs are generated for each of the mask bitmaps of each respective category. Each of the boundary polygons of a particular mask bitmap encloses a bitmap area that includes at least one image of each free-form object of the category associated with the particular mask bitmap.

At box 914, for each of the BPs generated from a respective mask, the BPs that are smaller than a selected threshold can be optionally decimated. For an example set of BPs generated from a particular mask, a smaller BP having an area that is less than 25 percent of the area of the largest BP, the smaller BP can be removed or otherwise erased. Erasing the smaller BPs can reduce processing requirements.

At box 915, the number of vertices in a BP can be reduced until pixel margin errors between a point of the BP and a corresponding point of the boundary of the bitmap exceeds pixel margin threshold. For BPs generated in response to the image(s) of each free-form object of each detected category, using an example pixel margin threshold value of 4-16 can reduce the number of vertices of the generated BPs to around 30 to 50 vertices (e.g., which is a reduction over the number of vertices potentially present in the indicated mask areas of the mask bitmap).

Figure 10:
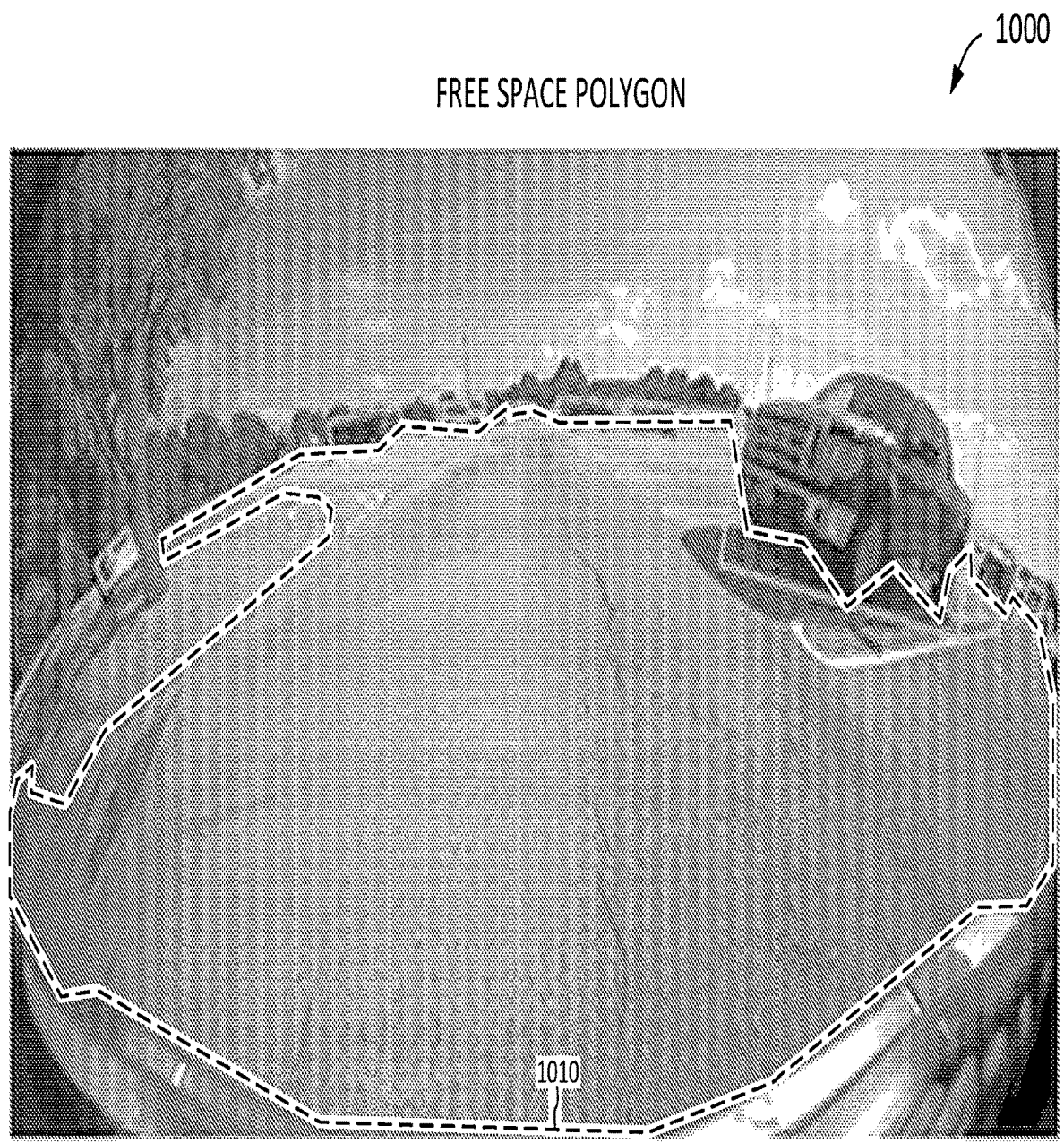
FIG. 10 is an example projection of boundary polygons representing a contour of a road object detected in an example image generated by a camera of a vehicle under a control of an example ADAS/AD system.

FIG. 10 is an example projection of boundary polygons representing a contour of a road object detected in an example image generated by a camera of a vehicle under a control of an example ADAS/AD system. Image 1000 is a mapped image that includes visible representations of segments and vertices of the boundary polygon 1010. The boundary polygon 1010 is an example boundary polygon generated in accordance with flow 900 described hereinabove. polygons 710 for each object detected by an OD neural network. For example, the boundary poly 1010 is a free-form object, which shows an area which is "drivable" with respect to the vehicle image range (e.g., visible range 510) and the vehicle OG (e.g., vehicle OG 310).

With reference to box 204 of FIG. 2, an example of updating an occupancy grid to indicate which tiles of the occupancy grid are drivable is described hereinbelow with reference to FIG. 11.

Figure 11:
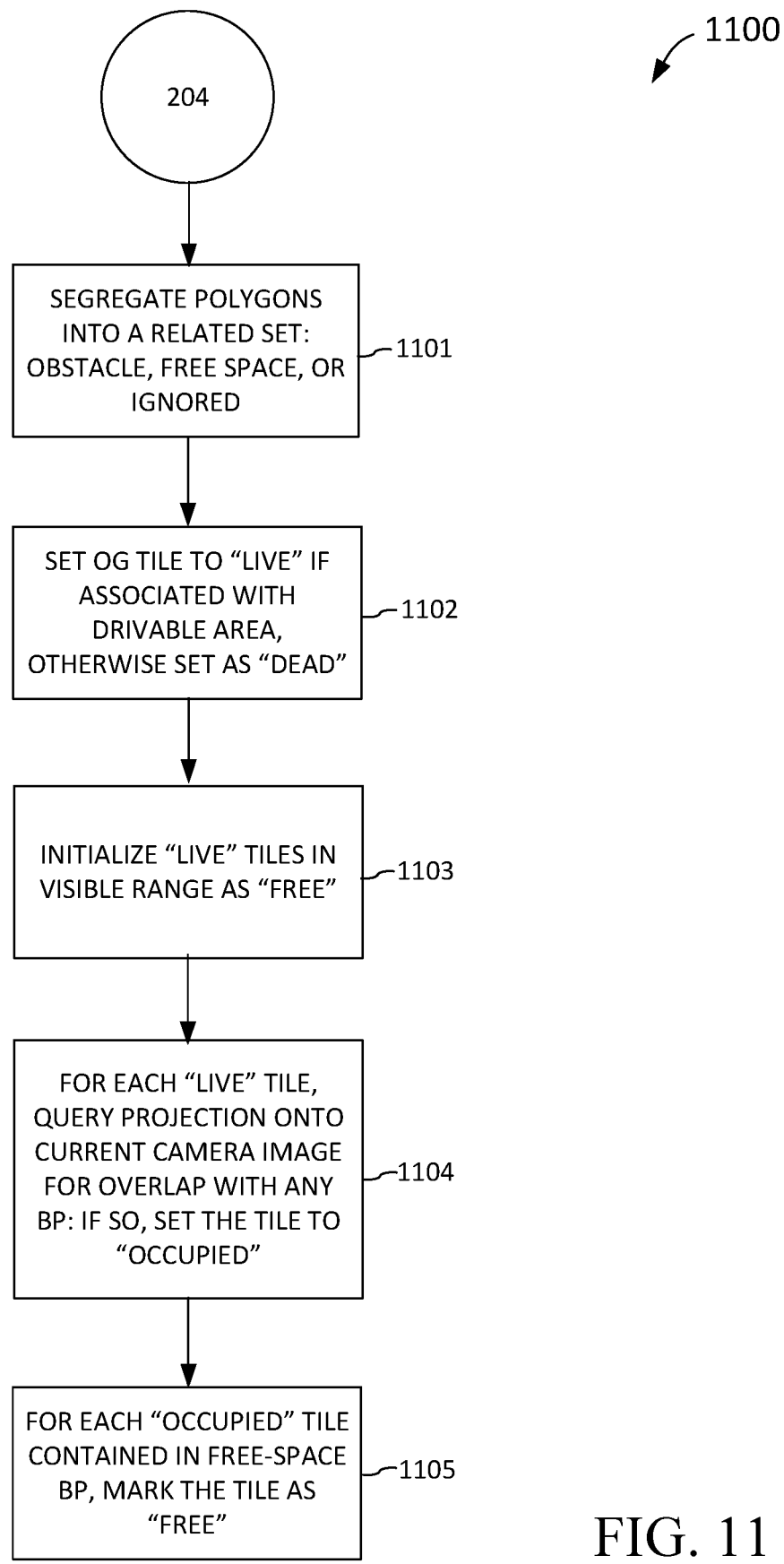
FIG. 11 is a flow diagram of an example method for updating an example occupancy grid to indicate drivable areas in an example ADAS/AD system.

FIG. 11 is a flow diagram of an example method for updating an example occupancy grid to indicate drivable areas in an example ADAS/AD system. For example, program flow of method 1100 is initiated at box 1101, where the boundary polygons (e.g., the BPs generated as described above with respect to FIG. 10) are segregated by associated each boundary polygons with one of the three sets: an Obstacle Set; a Free Space Set; and an Ignored Set.

For example, the Obstacle Set can include object categories such as pedestrian, vehicle, bicyclist, animal and the like. The Free Space Set can include categories such as a Road (where the Road could be indicated by more than one boundary polygon). The Ignored Set can include categories such as a Sky (where the Sky could be indicated by more than one boundary polygon).

At box 1102, each tile in an OG is set as "live" if they belong to drivable area, otherwise they are set to "dead." Determination of whether each (and every) tile is drivable can be determined in response to a semantic map. In an example, a semantic map can be an electronic map, which indicates over which the coordinates one or more roads traverse. (The semantic map is agnostic as to where dynamic objects such as dynamic obstacles and other vehicles might be with respect to particular areas of the roads of the semantic map.)

At box 1103, all the tiles that are set as "live" and which fall in the current visible range (e.g., as defined in the global coordinate system or a vehicle coordinate system) of the vehicle OG (and/or the portion of the global OG that is collocated with the vehicle OG) are initialized as "free."

At box 1104, each live tile (e.g., each live tile in the visible range) is queried to determine whether the projection of a given tile onto a current camera image overlaps any of the boundary polygons associated with (e.g., included by) the Obstacle Set. In response to a determination that a projection of a given tile a current camera image overlaps any of the boundary polygons associated with the Obstacle Set, the given tile is marked as "occupied."

In cases where obstacle boundary polygons are generated from information generated by an OD network, large pixel margin errors can exist because OD network does not generate pixel-level information. As shown in FIG. 7 portion of the free region (e.g., a Sky) above a vehicle falls within an OD polygon 710. To reduce the potential effects of the pixel margin errors of OD-generated polygons, at box 1105, each occupied tile is queried to determine whether the projection of a given tile is encompassed by (e.g., encompassed entirely within) a boundary polygon associated with the Free Space Set. In response to a determination that a projection of a given tile is encompassed by a boundary polygon associated with the Free Space Set, the given tile is marked as "free."

The described methods of updating tile states in an occupancy grid improves tile state updating speeds because tile checking can be limited to the occupied tiles that are detected by the OD network when the detected tiles fall within free space (as compared against having to check each tile in a currently visible range).

In an example, a navigation task is selected in response to a category of a detected object the is referenced by a semantic occupancy grid.

In an example, a trajectory plan for determining a future path of a vehicle controlled by an ADAS/AD system can include increasing safety margins in response to a determination that a detected object is a dynamic object (e.g., a pedestrian) as compared to generating smaller safety margin when the detect object is a static object (e.g., a pole of a streetlamp).

Modifications are possible in the described embodiments, and other embodiments are possible, within the scope of the claims.

What is claimed is:

1. A method comprising:
   receiving an image;
   generating an object detection (OD) polygon for each object detected in the image, each generated OD polygon encompassing at least a portion of the corresponding object detected in the image;
   associating a region of interest (ROI) with each generated OD polygon;
   generating a mask for each ROI, each mask configured as a bitmap approximating a size of the corresponding ROI;
   generating at least one boundary polygon for each mask based on the corresponding mask, each boundary polygon having multiple vertices and enclosing the corresponding mask; and
   reducing a number of vertices of the boundary polygons based on a comparison between points of the boundary polygons and respective points on the bitmaps.

2. The method of claim 1, wherein each object detected in the image is of a particular category.

3. The method of claim 2, wherein the particular category is fixed-form objects.

4. The method of claim 2, wherein the particular category is free-form objects.

5. The method of claim 1, wherein the generating of at least one boundary polygon for each mask includes tracing a boundary of bits of the corresponding mask.

6. The method of claim 1, further comprising:
   decimating each boundary polygon for a particular mask that is smaller than a threshold when more than one boundary polygon is generated for the particular mask.

7. The method of claim 1, further comprising, for each generated OD polygon:
   determining a first set of tiles in which each tile of the first set of tiles overlaps a portion of the corresponding OD polygon.

8. The method of claim 7, further comprising:
   determining, for each tile of the first set of tiles, whether that tile is encompassed within a semantic segmentation (SS) contour polygon.

9. The method of claim 8, further comprising:
   marking each tile of the first set of tiles that is determined to be encompassed within the SS contour polygon as free to generate an updated occupancy grid.

10. The method of claim 9, further comprising:
    generating a driving action based on the updated occupancy grid.

11. A driver assistance system comprising:
    a memory configured to store a received image;
    an object detection (OD) network configured to:
       generate an OD polygon for each object detected in the received image, each OD polygon encompassing at least a portion of the corresponding object detected in the received image,
       associate a region of interest (ROI) with each OD polygon,
       generate a mask for each ROI, each mask configured as a bitmap approximating a size of the corresponding ROI,
       generate at least one boundary polygon for each mask based on the corresponding mask, each boundary polygon having multiple vertices and enclosing the corresponding mask, and
       reduce a number of vertices of the boundary polygons based on a comparison between points of the boundary polygons and respective points on the bitmaps; and
    a semantic segmentation (SS) network configured to generate SS data for the received image.

12. The driver assistance system of claim 11, wherein the OD network is further configured to decimate each boundary polygon for a particular mask that is smaller than a threshold when more than one boundary polygon is generated for the particular mask.

13. The driver assistance system of claim 11, further comprising a processor configured to:
    for each generated OD polygon:
       determine a first set of tiles in which each tile of the first set of tiles overlaps a portion of the corresponding OD polygon,
       determine, for each tile of the first set of tiles, whether that tile is encompassed within a semantic segmentation (SS) contour polygon, and
       mark each tile of the first set of tiles that is determined to be encompassed within the SS contour polygon as free to generate an updated occupancy grid.

14. The driver assistance system of claim 13, wherein the processor is further configured to generate a driving action for a vehicle in response to the updated occupancy grid.

15. The driver assistance system of claim 14, wherein the driving action includes actuating a servo of the vehicle.

16. The driver assistance system of claim 14, wherein the driving action includes serving a notification to a passenger of the vehicle.

17. The driver assistance system of claim 11, further comprising a camera for generating the received image.

18. The driver assistance system of claim 11, further comprising a semantic segmentation (SS) network configured to detect each object in the received image.

* * * * *